United States Patent [19]

Maher

[11] 4,234,323
[45] Nov. 18, 1980

[54] COLLECTOR FOR WATER SEPARATOR

[75] Inventor: John F. Maher, Enfield, Conn.

[73] Assignee: United Technologies Corporation, Hartford, Conn.

[21] Appl. No.: 947,213

[22] Filed: Sep. 29, 1978

Related U.S. Application Data

[63] Continuation of Ser. No. 564,405, Apr. 2, 1975, abandoned, which is a continuation-in-part of Ser. No. 475,324, May 31, 1974, abandoned.

[51] Int. Cl.³ ............................................ B01D 45/16
[52] U.S. Cl. .......................................... 55/97; 55/259; 55/440; 55/441; 55/444; 55/446; 55/464; 55/465
[58] Field of Search ........................ 55/259, 440–446, 55/462–465

[56]  References Cited

U.S. PATENT DOCUMENTS

| 1,968,436 | 7/1934 | Bishop | 55/487 |
| 1,968,778 | 7/1934 | Caldwell | 55/257 PV |

FOREIGN PATENT DOCUMENTS 1232041  5/1971  United Kingdom ...................... 55/440

*Primary Examiner*—Frank Sever
*Attorney, Agent, or Firm*—Norman Friedland

[57]  ABSTRACT

Vanes, formed from a porous water droplet retaining material, extending vertically through which an airstream containing the water droplets passes, serves to separate the water droplets therefrom and collect it in the vane material where it gravitates to a water collecting basin disposed at the bottom of the vanes.

4 Claims, 7 Drawing Figures

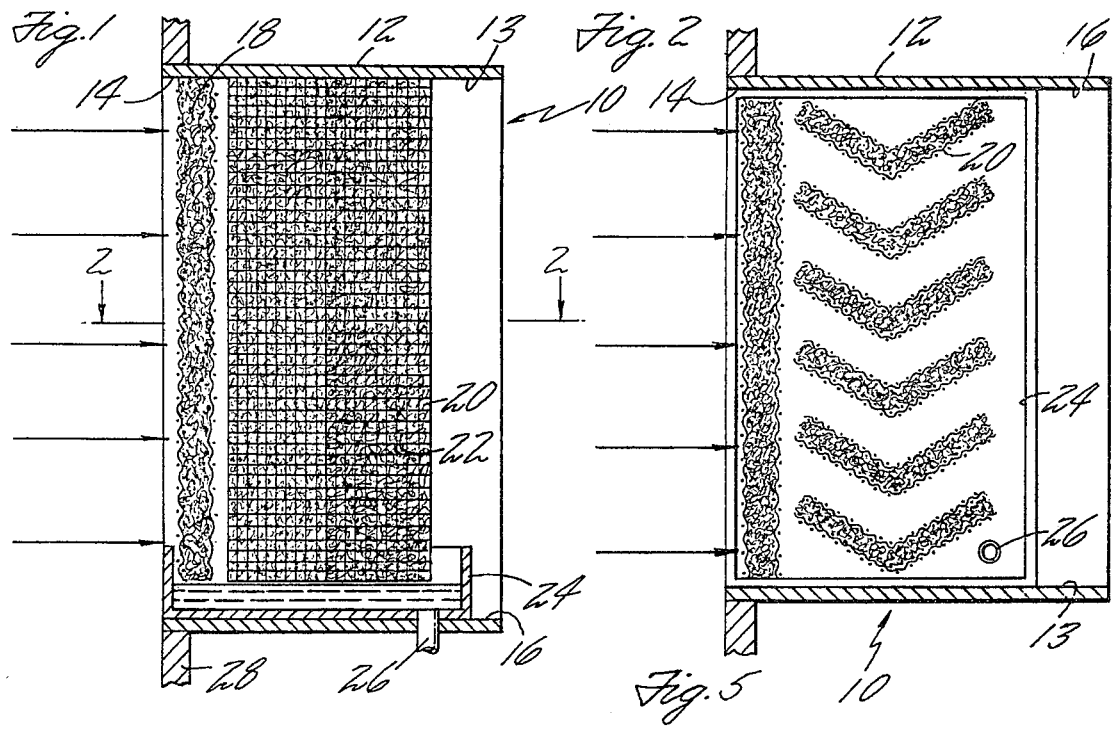
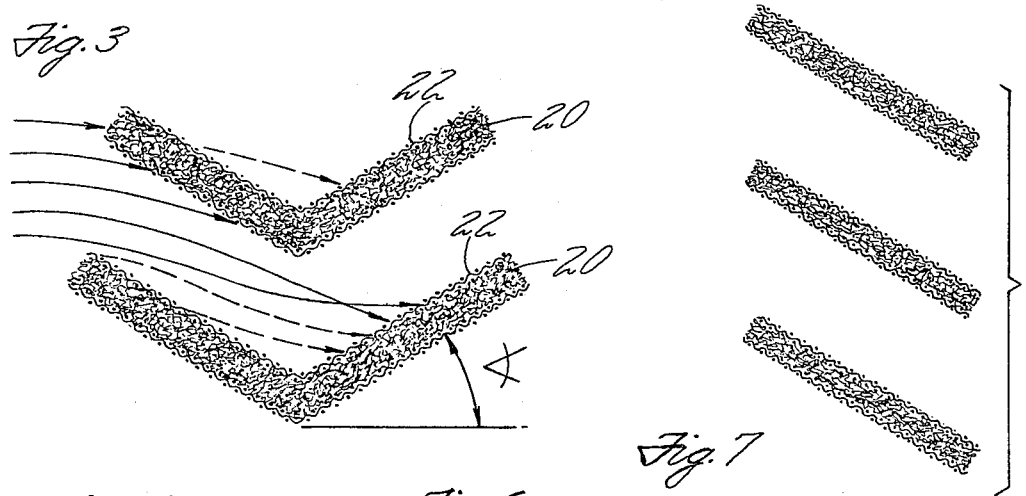
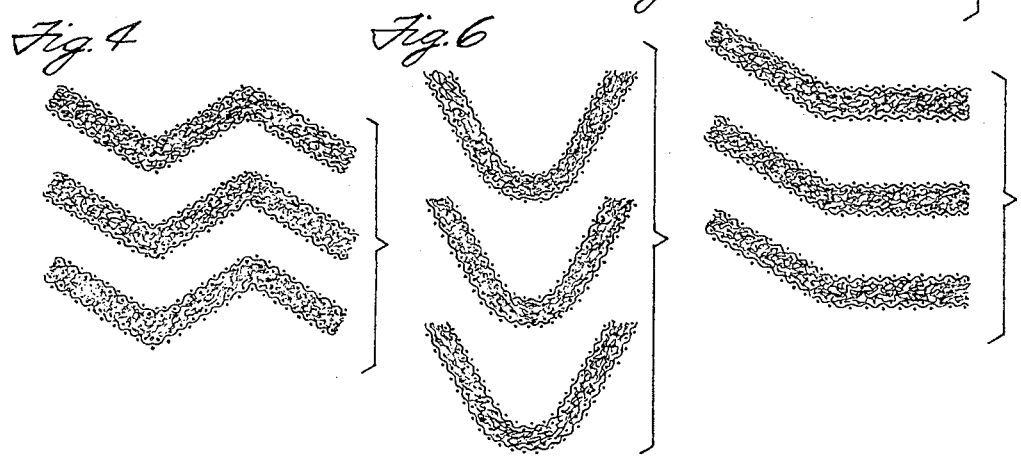

COLLECTOR FOR WATER SEPARATOR

CROSS REFERENCE TO RELATED APPLICATIONS

This is a continuaton of application Ser. No. 564,405 filed on Apr. 2, 1975, now abandoned, which is a continuation-in-part of application Ser. No. 475,324 filed on May 31, 1974, now abandoned.

BACKGROUND OF THE INVENTION

This invention relates to systems that condition the air and more particularly to means for removing water from the airstream.

Typical water separators are described in U.S. Pat. Nos. 3,339,349 granted to R. F. Farnum on Sept. 5, 1967 and 2,835,340 granted to T. J. McGuff and A. E. Reinhardt on May 20, 1958, both of which have been assigned to the same assignee. These two patents exemplify different means for separating the water from the airstream. In one instance, the 3,339,349 patent, this is effectuated by a centrifuge action by imparting a swirl velocity to the airstream. In the other instance the airstream passes through a porous material which is a knitted wire mesh fabric designed to collect the water droplet. However, in applications requiring high air flow velocities say 20 feet per second with extremely low pressure drop, as for example 1.0 inches of water and where space is limited, the heretofore known systems are unsatisfactory. Where the water separating systems described in U.S. Pat. Nos. 2,835,340 and 3,339,349 supra, were designed for aircraft application, the present invention is designed primarily for ships or industrial applications, particularly where water containing salts or other corrosive chemicals are carried in the airstream and can be injurious, say for example, to the power plant. This invention is particularly efficacious because it affords the following advantages.

1. Provides high collection efficiency usually observed to be 100% of entrained moisture in an airstream.
2. Simplicity of design configuration and manufacture.
3. Multiplicity of materials suitable for use including lightweight and corrosion resistant materials.
4. Provides secondary coalescing action by velocity component through the material to improve performance of an upstream coalescer.
5. Exacting design not critical to principles of inertial turning, collection and pressure drop.
6. Reduced pressure drop when compared to use of nonporous materials.
7. Self cleaning to a large extent precluding need for frequent washdown.
8. Low velocity of airstream through material with long length along flow stream maximizes drainage for final collection.
9. Low cost due to inherent lightweight and use of few vanes and turns.
10. Minimum space envelope required in direction of flow stream.

A laboratory scaled down model employing this invention has shown to remove substantially all of the free water drops contained in the airstream and exhibited extremely low pressure drops in the order of 1.0 inches of water.

SUMMARY OF THE INVENTION

An object of this invention is to provide an improved water separator.

A still further object of this invention is to provide water collection means formed by a plurality of vertically extended vanes formed from a porous water collecting material disposed in a housing having a water basin disposed at the bottom of the vanes for collecting the water migrating thereto due to gravity forces.

Other features and advantages will be apparent from the specification and claims and from the accompanying drawings which illustrate an embodiment of the invention.

BRIEF DESCRIPTION OF THE DRAWINGS

FIG. 1 is a side elevation, partly in section illustrating the details of this invention.

FIG. 2 is a sectional view taken along the lines 2—2 of FIG. 1.

FIG. 3 is an enlarged sectional view of a pair of adjacent vanes.

FIG. 4 is a sectional view illustrating another preferred vane configuration.

FIG. 5 is a sectional view illustrating another preferred vane configuration.

FIG. 6 is a sectional view illustrating another preferred vane configuration.

FIG. 7 is a sectional view illustrating another preferred vane configuration.

DESCRIPTION OF THE PREFERRED EMBODIMENT

As can be seen by referring to FIGS. 1 and 2 the water separator generally illustrated by numeral 10 comprises a substantially rectangularly shaped housing 12 defining a hollow chamber 13 having an inlet 14 and outlet 16 at either end. A coalescer 18 formed from suitable material is disposed adjacent the inlet and extends substantially to the inner walls of housing 12. As is well known, the coalescer serves to agglomerate the fine water particles in the airstream to larger particles and suitable coalescers are described in U.S. Pat. Nos. 2,835,340 and 3,339,349 supra.

Vanes 20 are suitably attached to the housing by any suitable means and extend vertically in the housing 12 and are canted relative to the air flow path. Each adjacent vane extends so that a portion has its line of sight equal to or extending beyond a portion of the adjacent vane. Thus a particle of moisture would not be able to pass straight through axially without impinging a vane.

Preferably the material for the vanes and coalescer are the same or similar and a suitable material is a matted synthetic fiber such as nylon that may be matted and random distribution of small diameter sized fibers characterized as being sufficiently porous to permit air flow to pass therethrough with a relatively low pressure drop and having the capacity to hold the drops of water entrained in the airstream. The porosity should be such that at least 5% of the air flow passes through the material and for good structural construction no more than 50% of the air should pass therethrough. The vanes when held by the screen should measure in thickness between $\frac{1}{8}$ inch to 1 inch. Since the vanes disposed in the flow area are porous and provide a relatively open flow area, the pressure drop is reduced.

It is apparent from the foregoing that the vanes permit a portion of the air to pass therethrough, although the greater tendency of the air is to turn in conformity to the path defined by adjacent vanes, thus imparting a turning moment to the airstream. This action, i.e. the turning moment, combined with a velocity component through the material itself serves to capture and restrain the water particles in the material. Since the water particles strike a basic porous material, they do not break-up but are collected by virtue of the material. With the low velocity through the vanes, the action of drainage into water basin 24 by gravity is enhanced. Drain line 26 may be included to remove the collected water. It is contemplated that the water separator may be either duct mounted or wall mounted as shown herein where housing 12 is supported in an opening formed in wall 28.

As can be seen in FIG. 3 a wire grid or screen 26 serves to add rigidity to the matted material to define the vane configuration.

FIGS. 4, 5, 6 and 7 illustrate other vane configurations which are designed to provide efficacious water removal features. Thus in each vane construction, the vane turns the airstream along the direction of flow yet still retains some velocity component through a vane. Inertia of free moisture particles combined with the flow component carry the particles into the porous material for collection and drainage. The vanes are arrayed in a vertical fashion with respect to gravitational forces and the leading edge of each vane is at some incidence angle to the normal flow stream.

I claim:

1. The method of removing water from the airstream entering a jet type power plant powering marine vessels so as to remove the corrosive elements in the airstream where the airstream flows at substantially 20 feet per second comprising the steps of:

mounting a plurality of vane-like elements formed from a low porosity material disposed at a predetermined angular relationship to the stream ahead of the inlet of the engine, and each vane-like element spaced relative to each other to form open ended passages where the material of said vane-like element is formed from an array of nonabsorbent fibers prematted into a preformed vane-like element having a thickness between ⅛ to 1 inch;

passing the air through said low porosity material such that more than 10% of said air by volume passes through said material and the remaining air passes through said passages at a pressure drop not exceeding substantially 1.0 inch of water; and collecting by gravity the water entrained in said material.

2. The method of claim 1 including mounting a coalescer formed from material substantially identical to the material of the vane-like element into an array of nonabsorbent fibers prematted in flat sheets disposed ahead of said preformed vane-like elements and passing the same airstream as in the step of passing the air through said low porosity-material through said coalescer prior to passing it through said vane-like elements and said passages.

3. The method of claim 2 wherein the matted nonabsorbent fiber is formed from nylon.

4. The method of claim 3 with the vane-like elements having a V-like shape in cross section and the apex of the vane being in a plane vertical to the earth's horizon and the arms of the V-like shaped vane being coextensive with said coalescer in the vertical plane and the space between adjacent vane-like elements defining a vertical open-ended passage and a plane perpendicular to the apex of said V-like shaped vane including the end portions of each of the arms of said V-like shaped vane and passing the airstream through said open ended passages so that a portion of the airstream has a tendency to bend in conformity with said V-like shaped vane.

* * * * *